(12) United States Patent
Mueller et al.

(10) Patent No.: US 8,852,441 B2
(45) Date of Patent: Oct. 7, 2014

(54) APPARATUS FOR PURIFYING LIQUIDS, IN PARTICULAR FOR PURIFYING BALLAST WATER

(75) Inventors: Uwe Mueller, Horn (CH); Wilfried Riggers, Bremervoerde (DE)

(73) Assignee: Gea Westfalia Separator Group GmbH, Oelde (DE)

( * ) Notice: Subject to any disclaimer, the term of this patent is extended or adjusted under 35 U.S.C. 154(b) by 836 days.

(21) Appl. No.: 12/994,687

(22) PCT Filed: May 26, 2009

(86) PCT No.: PCT/EP2009/003731
§ 371 (c)(1),
(2), (4) Date: Jun. 20, 2011

(87) PCT Pub. No.: WO2009/144006
PCT Pub. Date: Dec. 3, 2009

(65) Prior Publication Data
US 2011/0240564 A1    Oct. 6, 2011

(30) Foreign Application Priority Data
May 26, 2008  (DE) .......................... 10 2008 025 168

(51) Int. Cl.
C02F 1/32 (2006.01)
C02F 1/36 (2006.01)

(52) U.S. Cl.
USPC ................ 210/748.1; 210/748.02; 210/323.1; 210/333.01; 210/335

(58) Field of Classification Search
CPC ............ C02F 1/001; C02F 1/36; C02F 1/444; C02F 1/325; C02F 2103/008; B63J 4/004; B63J 4/002
USPC .............. 210/748.1, 748.11, 748.12, 748.13, 210/748.02, 748.03, 748.04, 748.05, 188, 210/323.1, 332, 333.01, 335, 340
See application file for complete search history.

(56) References Cited

U.S. PATENT DOCUMENTS

| | | | |
|---|---|---|---|
| 5,141,636 A * | 8/1992 | Flanagan et al. .............. 210/209 |
| 5,707,594 A * | 1/1998 | Austin ........................ 422/186.3 |
| 5,951,876 A * | 9/1999 | Snowball ................. 210/748.11 |
| 6,235,191 B1 * | 5/2001 | Nakamura ...................... 210/85 |
| 6,395,186 B1 * | 5/2002 | De Kock et al. ......... 210/748.05 |
| 6,555,011 B1 * | 4/2003 | Tribelsky et al. ........ 210/748.03 |
| 6,638,422 B1 | 10/2003 | Schwartzkopf | |

(Continued)

FOREIGN PATENT DOCUMENTS

DE    698 02 716 T2    5/2002
GB    2 268 488 A    12/1994

(Continued)

OTHER PUBLICATIONS

Digital-Detective.Co.UK, "WebDate—Bildschirmaufnahme zum Nachweis des Zeitpunkts der letzten Änderung der Internetseite", Webdate, Jul. 28, 2009, Software Webdate, Version 1.0 Digital Detective, XP-002539087.

(Continued)

Primary Examiner — Fred Prince
(74) Attorney, Agent, or Firm — Saliwanchik, Lloyd & Eisenschenk

(57) ABSTRACT

The invention relates to an apparatus for purifying liquids, in particular for purifying ballast water.

25 Claims, 8 Drawing Sheets

(56) References Cited

U.S. PATENT DOCUMENTS

| | | | |
|---|---|---|---|
| 6,984,313 B2 * | 1/2006 | Mark | 210/106 |
| 8,318,021 B2 * | 11/2012 | Armour | 210/636 |
| 2005/0029204 A1 | 2/2005 | Schwartzkopf | |
| 2005/0211639 A1 * | 9/2005 | Nguyen et al. | 210/748 |
| 2005/0236327 A1 * | 10/2005 | Gordon et al. | 210/631 |
| 2007/0284315 A1 * | 12/2007 | Collins et al. | 210/748 |
| 2010/0116647 A1 * | 5/2010 | Kornmuller et al. | 204/228.1 |

FOREIGN PATENT DOCUMENTS

| | | |
|---|---|---|
| JP | 2007-244930 A * | 9/2007 |
| WO | WO 99 33752 A1 | 7/1999 |
| WO | WO 2004/002895 | 1/2004 |
| WO | WO 2007/130029 | 11/2007 |
| WO | WO 2008/039147 | 4/2008 |
| WO | WO 2008/039278 A1 * | 4/2008 |

OTHER PUBLICATIONS

Oemcke, "The Treatment of Ships' Ballast Water", Internet Citation [Online], Retrieved from the Internet on Aug. 22, 2002:URL:<http ://www.pcq.com/au/pdf/pauline2.pdf>, XP-002210574.

Taylor et al., "Suggested Designs to Facilitate Improved Management and Treatment of Ballast Water on New and Existing Ships", Internet Citation [Online], published May 26, 2007, Retrieved from the Internet on Jul. 28, 2009: URL:<http://www.daffa.gov.au/_data/assets/pdf_file/0018/23661/rep12.pdf>, XP-002539086.

* cited by examiner

APPARATUS FOR PURIFYING LIQUIDS, IN PARTICULAR FOR PURIFYING BALLAST WATER

CROSS REFERENCE TO A RELATED APPLICATION

This application is a National Stage Application of International Application Number PCT/EP2009/003731, filed May 26, 2009; which claims priority to German Application No. 10 2008 025 168.2, filed May 26, 2008; which are incorporated herein by reference in their entirety.

The invention relates to an apparatus for purifying liquids, in particular for purifying ballast water.

Ballast water is taken up by seagoing vessels in order to stabilize the ship and to ensure its seaworthiness during unloaded trips. For this, sea or river water is taken up into specific ballast water tanks or, in case of the in the meantime common double-walled hulls, into the cavity between both shell plates of the hull. By taking up ballast water at a first location and releasing the same at a second location, regularly a transmission of organisms into foreign ecosystems takes place (neozoic problem).

In order to address this problem, seagoing vessels are commonly equipped with coarse mechanic filters for filtering the ballast water that was taken up. Hereby, it is disadvantageous that the filters which are, for example, composed of wire-mesh like grids, require regular maintenance and cleaning.

In some cases the ballast water, which in part can be stored for over weeks, during its discharge is treated with UV-light for disinfection. Hereby, it is disadvantageous that organisms which, for example, were introduced as young animals or larvae into the ballast water tank, such as, for example, fish or crabs, in the tank can develop into adult animals, which survive such a UV-treatment relatively intact. Furthermore, the population of microorganisms and algae which, in part, has drastically increased for over weeks, requires a high UV-intensity, and thus a high input of energy. As an alternative to the UV-treatment, in some cases a treatment of the ballast water with chlorine is performed. Nevertheless, the release of highly chlorine-contaminated water also represents a very critical intervention into the local ecosystem.

Therefore, the methods and facilities for purifying ballast water as known in the state of the art provide only a low flexibility, reliability and/or environmental safety when treating ballast water. Furthermore, known methods and facilities for ballast water treatment require a relatively high maintenance effort, nevertheless, without providing a sufficient protection against the transmission of organisms into foreign ecosystems.

It is therefore an object of the present invention, to provide an apparatus for purifying liquids, in particular for purifying ballast water, which can be reliably operated at a low expense and with high flexibility, and can ensure a sufficient degree of purity of the stored liquid.

This object is solved by the combination of features according to claim 1. Preferred embodiments are described in the subclaims.

The apparatus for purifying liquids, in particular for purifying ballast water according to the invention comprises at least two filter modules and a reactor with at least one UV-light source. Each filter module comprises an inlet for the liquid to be purified, a first outlet, a filter, and a second outlet for the filtered liquid, wherein for liquid incoming through the inlet the first outlet is positioned before the filter, and the second outlet is positioned behind the filter. Therefore, the first outlet and the second outlet are positioned on different sides of the filter.

Therefore, the liquid to be purified which is incoming into the respective filter module through the inlet, can flow out of the filter module through the first outlet without passing through the filter. Also, the liquid to be purified which is incoming through the inlet can pass through the filter and leave the filter module through the second outlet.

The reactor of the apparatus is connected to the first outlets through a first line, through which a first volume flow can be directed to the reactor. The reactor is connected to the second outlets through a second line, through which a second volume flow can be directed to the reactor. Furthermore, the reactor is adapted to expose both the first and the second volume flow to the irradiation of the UV-light source.

The advantage of this apparatus consists in its high flexibility, since in particular the following three possibilities for purifying the liquid, and thus in particular for the ballast water, exist:

First, the apparatus provides the possibility that the liquid to be purified can flow unfiltered out of the filter module through the first outlet, and subsequently be supplied as first volume flow to (only) the UV-treatment.

Furthermore, the apparatus provides the possibility that the liquid to be purified is already depleted of animals, organisms and other particular matter up to a particular size through filtration in the filter module before the subsequent UV-treatment. Hereby, the immediately (both locally as well as temporally) following UV-treatment is unburdened, so that this can be operated with lower energy costs.

Furthermore, in a third possibility the advantages of both other possibilities can be combined: In a first volume flow the fraction of the liquid to be purified, which leaves a corresponding filter module through the first outlet, arrives at the reactor and is treated therein with UV-light. At the same time, in a second volume flow the remaining fraction of the liquid to be purified, which flows through the second outlet out of the respective filter module, can be directed to the reactor in form of a second volume flow and treated with UV-light separately from the first volume flow.

By providing of separated volume flows therefore, for example, the times of contact, during which the respective volume flow is subject to the UV-radiation, can be flexibly and independently adjusted from each other. Thus, a flexible treatment of the liquid to be purified in a first and/or second volume flow depending on the degree of impurities and/or the degree of purity to be achieved of the liquid is possible.

Preferably, for this the first volume flow and the second volume flow are directed through the reactor separately from each other. Preferably, furthermore the first and second volume flows, that are each passed by separately as closely as possible to the UV-light source of the reactor.

In a preferred embodiment, the second outlets are connected through a back-flushing-line in such a manner that a back-flushing of the filter of the one filter module can take place using filtered liquid of the other filter module. The advantage of this apparatus consists in that during operation a back-flushing of one filter module can take place, while the other filter module continues to function normally. Thereby, a reliable continuous operation is made possible.

Preferably the inlet of each filter module has a valve. Also preferably, the first outlet of each filter module has its own valve. A controlled and flexible regulation of the incoming flow and the outgoing flow into the respective filter module is hereby made possible. For the above-mentioned back-flushing of the filter of the one filter module, the inlet valve thereof is closed and the valve of the first outlet thereof is opened. Furthermore, each of the second outlets can be provided with a controllable valve.

Preferably, the apparatus is adapted in a way that the liquid which has been back-flushed through the filter of the one filter module is directed to the reactor through the first line as first volume flow. The apparatus according to the invention thus has the advantage that back-flushed liquid is separately directed through the first line through the reactor, and can be exposed to a separate treatment compared to filtered liquid, which can flow to the reactor through the second line.

Preferably, the apparatus has a first container for storing of the liquid to be purified, which is connected to the inlets. Particularly preferred, the apparatus furthermore has a second container which is positioned in the first line, and adapted to buffer liquid. Hereby it is made possible to buffer the (back-flushed) liquid and, for example, to direct it through the reactor with a very low throughput, and thus to increase the time of contact for the back-flushed (that is, the increasingly polluted and contaminated) liquid.

Particularly preferred the reactor further comprises a source of ultrasound for an admission of the first and the second volume flow with ultrasound. Through the cavitation as caused by the ultrasound, a damaging and killing of microorganisms and other organic/inorganic matter dissolved or suspended in the liquid to be purified which has not been removed through the previous filtration is achieved. Hereby the level of purity of the liquid that can be achieved as well as the performance of the apparatus is increased further, and the flexibility of the overall apparatus is improved.

In a particularly preferred embodiment, the reactor comprises an inlet leading into the inside of the reactor, and an outlet leading out of the inside of the reactor. Preferably, the UV-light source and/or the source of ultrasound are positioned in the inside of the reactor. The resulting admission of the inside of the reactor with ultrasound, in addition to a purification of liquid(s) as passing by, ensures an ongoing purification of the surfaces that come in contact with the liquid(s) from deposits of any kind, whereby a reliable continuous operation is guaranteed.

In a particularly preferred embodiment the second line is connected with the inlet of the reactor in such a manner that the second volume flow flows through the inlet into the inside of the reactor and through the outlet out of the inside of the reactor. Depending from the dimensions of the reactor thus a relatively high throughput of the filtered liquid through the inside of the reactor can be achieved. Particularly preferred the reactor further comprises a line for liquids which passes through the inside of the reactor, and which in particular in the inside of the reactor is enclosed liquid-tight from the inside of the reactor. The line for liquids thus provides the possibility to direct a volume flow of liquid to be purified through the inside of the reactor separated from the inside of the reactor, without allowing immediate contact with the inside of the reactor or a liquid as present therein, respectively.

For this, it is particularly preferred that the line for liquids which passes through the reactor is connected with the first line in such a manner that the first volume flow flows through the line for liquids through the inside of the reactor. Hereby, it is ensured that the first volume flow is directed through the inside of the reactor and an the UV-light source and, optionally, is passed by the source of ultrasound separately from the second volume flow, whereby a separate treatment of the first volume flow compared to the second volume flow is possible, and an admixing of the first and the second volume flow in the reactor is avoided.

Particularly preferred, the line for liquids is made of a UV-permeable material. Specifically, the line for liquids can comprise one or several quartz pipes.

In particular, the quartz pipes can be laid out in parallel. Alternatively, the quartz pipes can be connected with another in such a manner that they are laid out in series. In case of quartz pipes laid out in parallel, the advantage exists that a relatively high throughput can be achieved. In case of quartz pipes laid out in series, the advantage exists that the liquid as flowing through the quartz pipes, and thus through the inside of the reactor, is subject to several purifications.

The reactor preferably can also be crossed by at least one quartz pipe, in which the UV-light source, and in case of several UV-light sources one UV-light source each, is positioned.

In a particularly preferred embodiment, the filter of each filter module comprises a membrane. Preferably, each filter module further comprises a source of ultrasound for irradiating the membrane with ultrasound. For this, the membrane is formed out of a material that withstands a treatment with ultrasound, for example stainless steel or other metallic alloys. Through the irradiation with ultrasound both during operation and back-flushing of the membrane a clogging of the membrane with deposits is avoided. Preferably, the source of ultrasound for liquid flowing into the filter module is positioned before the filter, that is, on the usually more contaminated side of the filter.

The membrane can have pores of less than 1000 µm, preferably of less than 100 µm, and most preferred of less than about 50 µm. For the conditioning of ballast water, a pore size of at most about 30 µm is advantageous. For a micro filtration, also pores having a pore size of down to 0.1 µm can be used.

In particular, the apparatus can also comprise more than two filter modules that are connected to each other in the above sense for a back-flushing.

In addition, also two filter modules (each) can be connected to each other in series in a way that the first outlet of the first filter module (each) is connected with the inlet of the second filter module (each). Particularly in case of strongly contaminated liquid to be purified can in the first filter module a pre-purification and in the second filter module a main purification/filtration can take place.

Particularly preferred, the overall apparatus is adapted for a treatment of salt-containing water, in particular sea water.

One particular use of the above-described apparatus according to the invention for the purification of liquids is the treatment of ballast water. Hereby, in turn each one of the filter modules can each be back-flushed.

Additional features and advantages of the invention are described in the following descriptions of embodiments based on the attached figures and in the claims.

Figure 1:
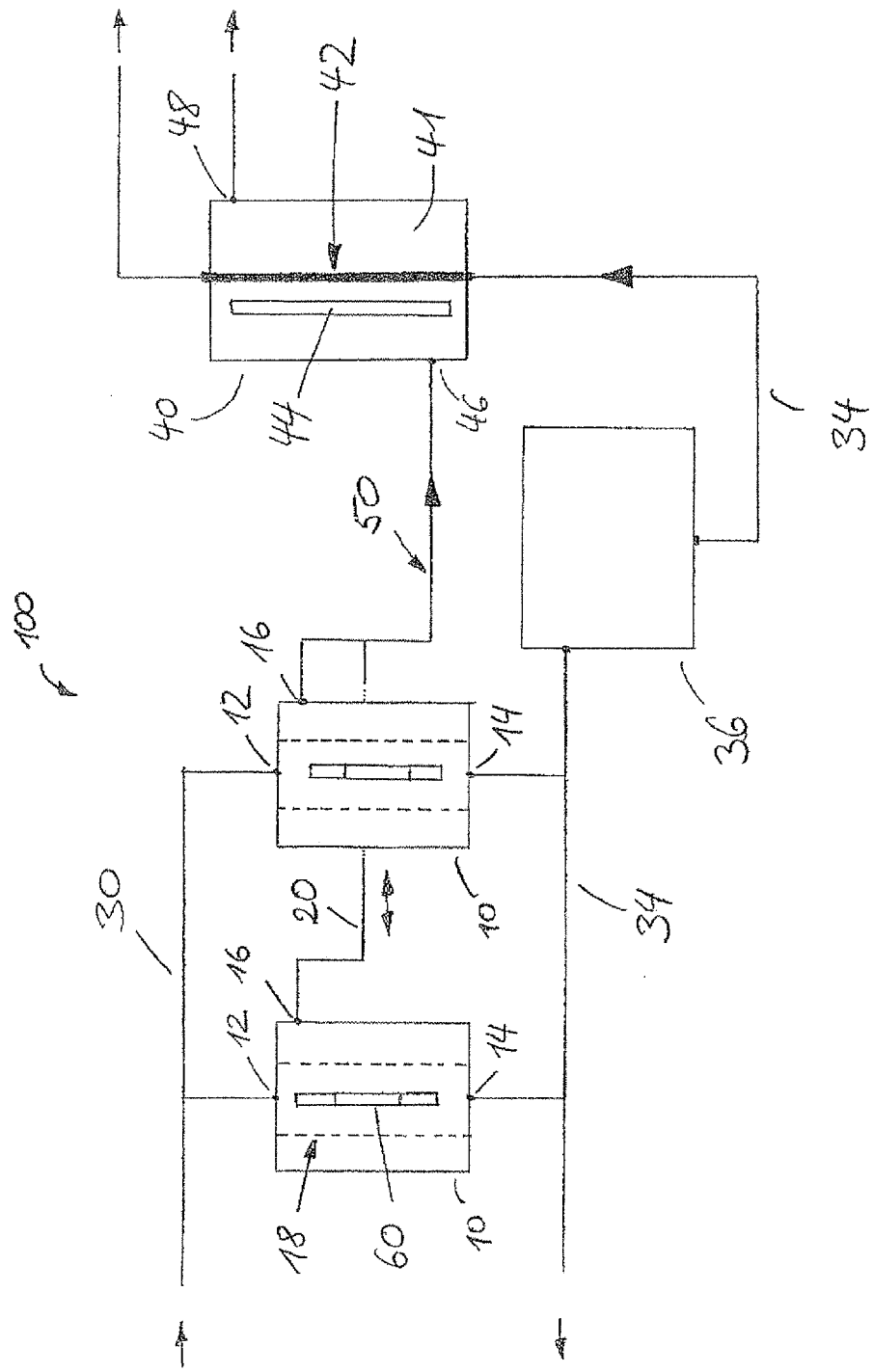
FIG. 1 shows a schematic depiction of an apparatus according to the invention for the purification of liquids.

FIG. 1 schematically shows an embodiment of the apparatus for the purification of liquids.

The apparatus 100 comprises two filter modules 10, that each have the shape of a hollow circular cylinder, and are formed out of a stainless steel pipe, which is closed on both of its ends. At the upper end of each filter module an inlet 12 for the liquid to be purified is provided, and at the lower end a first outlet 14 for the liquid is provided. Furthermore, a second outlet 16 is provided on the mantel of the pipe of the filter module 10 near the upper end thereof.

In the inside of the filter module 10, a stainless steel membrane with pores of about 30 μm is provided. The stainless steel membrane 18 also has the form of a hollow circular cylinder, which is positioned essentially coaxially (i.e., concentrically in a cross section) in the stainless steel pipe of the filter module 10, wherein the diameter of the stainless steel membrane is smaller than the diameter of the filter module 10. The inlet 12 and the first outlet 14 are located at about the middle of the circular upper or lower end of the filter module 10 (i.e., the lid or the bottom, respectively). Thus, the liquid flowing through the inlet 12 into the inside of the filter module 10 can flow out from the filter module 10 through the first outlet 14, without passing through the cylindrical filter membrane 18. In this sense, the first outlet 14 is therefore positioned before the filter membrane 18. In contrast to this, liquid flowing into the filter module 10 through the inlet 12 can only flow through the second outlet 16 out of the filter module 10, if it beforehand passes through the filter membrane 18. In this sense, the second outlet 16 is each positioned after the filter membrane 18.

Both second outlets 16 are connected to each other through a back-flushing line 20 for an exchange of liquids.

Figure 2:
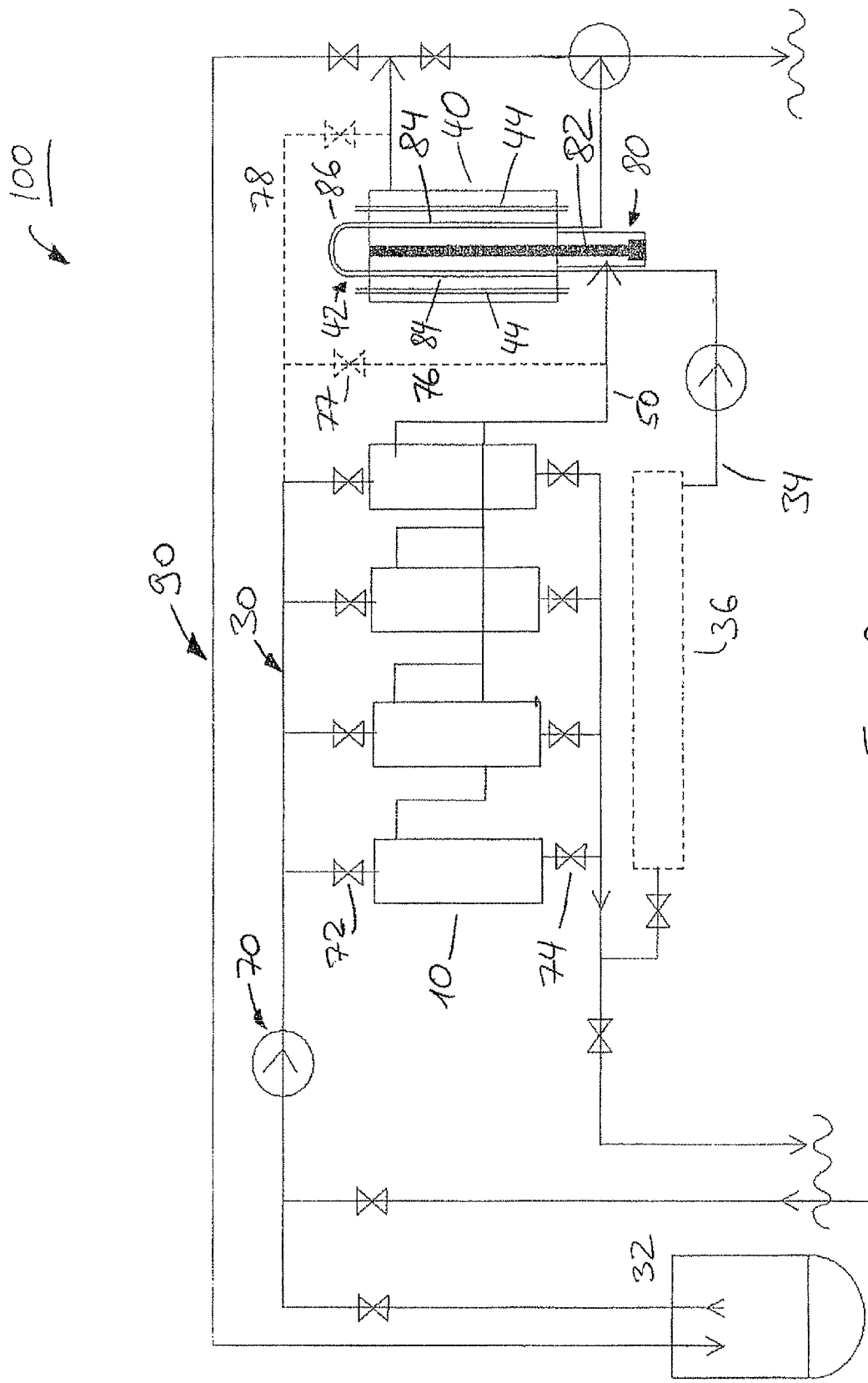
FIG. 2 shows a detailed depiction of an embodiment of the apparatus according to the invention.

As depicted in FIG. 1, each filter module 10 at the upper end thereof through the inlet 12 is connected to a liquid supply 30, which is fed by a first container 32 having the form of a ballast water tank (not shown in FIG. 1; see FIG. 2).

At the opposite end, each filter module 10 through the first outlet 14 is connected to a first line 34. In the first line 34, a second container 36 is provided as a buffer for liquids.

The first line 34 leads to an elongated reactor 40, which encloses an inside of the reactor 41. The inside of the reactor 41 is crossed in the longitudinal direction by a line for liquids 42, which is formed of a quartz pipe. Furthermore, an elongated UV-light source 44 ranges through the inside of the reactor 41, which just like the quartz pipe is essentially arranged in parallel to the longitudinal axis of the reactor 40. The first line 34 at in the longitudinal direction lower end of the reactor 40 merges into the line for liquids 42 in form of a quartz pipe. The line for liquids 42 at the other end of the reactor 40 leads out of the inside of the reactor 41, and merges into a further line for liquids, which is, for example made of quartz or fiberglass. Indeed, in the figures only straight, elongated embodiments are shown, nevertheless, in particular for the line for liquids 42, a spiral or helically intertwined configuration is conceivable, wherein, for example, the line for liquids 42 each surrounds a UV-light source 44 being positioned in a quartz pipe in the absolute close-up range (not shown).

The reactor 40 has essentially the form of a hollow circular cylinder, and on its mantel surfaces is provided with an inlet 46 close to the bottom end, and with an outlet 48 close to the upper end thereof. The second outlets 16 of the filter modules 10 are connected through a second line 50 with the inlet 46 leading into the inside of the reactor 41.

Each filter module 10 is further provided with an essentially rod-shaped source of ultrasound 60, which is positioned in the hollow cylindrical form of the filter module 10 slightly offset to the longitudinal axis thereof (i.e. eccentrically). In the same manner, an eccentric source of ultrasound is positioned in the inside of the reactor 41 (not shown). The sources of ultrasound each provide for a purification of liquids and a purification of the filter module 10, specifically of the filter 18 or the reactor 40.

Additional details of the apparatus 100 and the function and effect of the elements of the apparatus 100, both individually as well as in combination, are now described based on the FIGS. 2-7.

FIG. 2 shows an embodiment of the apparatus 100, which serves as an apparatus for purifying ballast water. As shown in FIG. 2, a ballast water pump 70 is provided in the liquid supply 30, in order to pump water either from the sea or from the ballast water tank 32 into the inlets 12 of the filter modules. Each inlet 12 of the four filter modules 10 as shown comprises an inlet valve 72 for controlling the inflow into the respective filter module 10. Furthermore, each first outlet 14 has a valve 74 for controlling the liquid flow as flowing out of the first outlet 14. The embodiment as shown in FIG. 2 furthermore has a first bypass-line 76 and a second bypass-line 78. The first bypass-line connects the liquid supply 30 with the second line 50. Thus, in case of closed inlet valves 72 of all filter modules 10, the liquid to be treated can be directed through a bypass into the reactor 40 without prior filtration. The second bypass-line 78 connects the liquid supply 30 to the line for liquids as connected to the outlet 48 of the reactor 40. This, in case of closed inlet valves 72 of all filter modules 10 and closed first bypass-valve 77, which is positioned in the first bypass-line 76, the liquid can be pumped back into the sea without flowing through the filter module 10 or the UV-reactor 40, respectively.

As shown in FIG. 2, the reactor 40 at the lower end thereof has a cavitation chamber 80, which has a smaller diameter compared to the upper part of the reactor 40, and into which the liquid inlet 46 of the reactor 40 is converging. In the inside of the reactor 41, a rod-shaped source for ultrasound 82 extends across the full length of the reactor 40, that is, through the cavitation chamber 80 and the upper part of the reactor 40 as being attached thereto, which is positioned slightly offset from the longitudinal axis of the reactor 40, that is, eccentrically in a cross-sectional view. Furthermore, two quartz pipes cross through the inside of the reactor 41 in the upper part of the reactor 40 (not shown in FIG. 2), each housing one of the UV-light sources 44 as shown in FIG. 2. Furthermore, the inside of the reactor 41 is crossed by two additional quartz pipes 84 that form the line for liquids 42, wherein one of the quartz pipes 84 at the lower end thereof is connected to the first line 34. At the other end, this quartz pipe 84 is connected through a pipe connection 86 to the respective end of the second quartz pipe 84. Thus, liquid, for example highly contaminated back-flushing liquid, which reaches the reactor 40 through the first line 34, can be directed twice through the inside of the reactor 41, namely during rising in the first quartz pipe 84 and during falling through the second quartz pipe 84. During each passage through the inside of the casing, the liquid is both exposed to UV-radiation, since quartz is permissible for UV-radiation, and also to ultrasound, since the quartz pipes pass the ultrasound to the liquid flowing through them. Hereby, a very effective purification of the first volume flow, which reaches the reactor through the first line 34, can be ensured. Depending on the number of the quartz pipes 84 arranged in series, therefore a multi-treatment of the liquid can be achieved, which depends from the number of the quartz pipes 84 as provided. The present invention is not limited to two quartz pipes 84, but can comprise any number of quartz pipes 84 in dependency from the result to be achieved. In addition, the purification can be amplified by the above-mentioned spiral or helically intertwined configuration of the line for liquids 42 in form of the quartz pipes 84 around one of the UV-light sources 44.

A second volume flow (main flow) passes through the second line 50 and the inlet 46 leading into the cavitation chamber 80 of the reactor 40 in the inside of the reactor 41. In the cavitation chamber 80 the incoming liquid of the second volume flow is exclusively exposed to ultrasound from the source of ultrasound 82. The second volume flow in the inside of the reactor 41 flows from the inlet 46 to the outlet 48, and thus from the cavitation chamber 80 into the upper part of the reactor 40. In this upper part, the second volume flow is additionally exposed to ultrasound, and furthermore exposed to the UV-radiation, which originates from the UV-light sources 44 positioned in the quartz pipes. The second volume flow then leaves the reactor 40 through the outlet 48, and is fed into a recycling line 90. The first volume flow, which has passed through the quartz pipes 84, is also fed into the recycling line 90 through an injector nozzle. Through the recycling line 90 the accordingly treated purified liquid of the first and/or second volume flow either reaches back into the ballast water tank 32, or into the sea (in accordance with the adjustment of the valves in the recycling line 90 as shown in FIG. 2).

Figure 3:
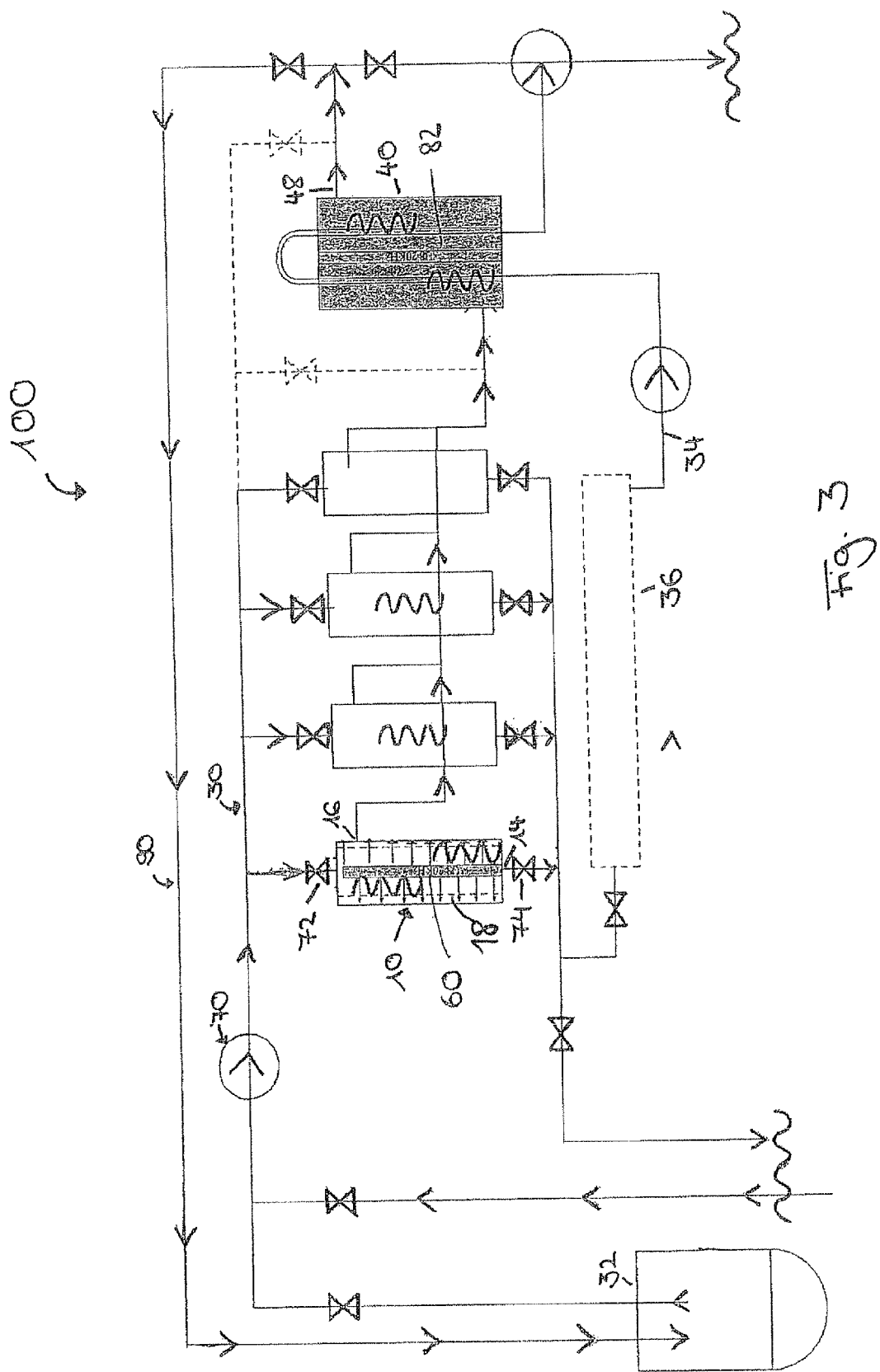
FIGS. 3-7 show the use of the embodiment of the apparatus according to the invention as depicted in FIG. 2 when treating of ballast water.

FIG. 3 shows an embodiment of the apparatus 100 during taking up of ballast water.

The inlet valves 72 of the first three (from the left) filter modules 10 as shown in FIG. 3 are completely open. Furthermore, the respective valves 74 of the respective first outlets 14 of the first three filter modules 10 are at least partially open. The inlet valve 72 and the valve 74 of the first outlet of the fourth filter module 10 (i.e., the filter module on the right) are both closed. As is indicated by the arrows of the arm of the liquid supply 30 leading into the sea, the ballast water pump 70 ensures that water from the sea reaches into each of the first three filter modules 10. In each of the first three filter modules 10, a first fraction of the water reaches the lower end of the filter module without passing through the filter 18, and passes through the first outlet 14 of the respective filter module 10, whereby this first fraction of the water immediately flushes larger objects and organisms as present in the water from the respective filter module 10 back into the sea through a branching of the first line 34 as shown in FIG. 3. The second fraction of the water that is entering into the respective filter module 10 passes through the filter 18 and through the respective second outlet 16 and the second line 50 reaches the inside of the reactor 40. In the inside 41 of the reactor 40 the liquid is irradiated with ultrasound from the source of ultrasound 82 (after it was already prior exposed to ultrasound from the source of ultrasound 60 in the filter module 10) and UV-radiation from the UV-light source 44 not shown in FIG. 3. The water flowing through the outlet 48 from the inside of the reactor 41 flows into the ballast water tank 32 through the recycling line 90. The water as taken up and directed into the ballast water tank 32 is thus filtered and disinfected and purified using both UV-radiation and ultrasound.

Figure 4:
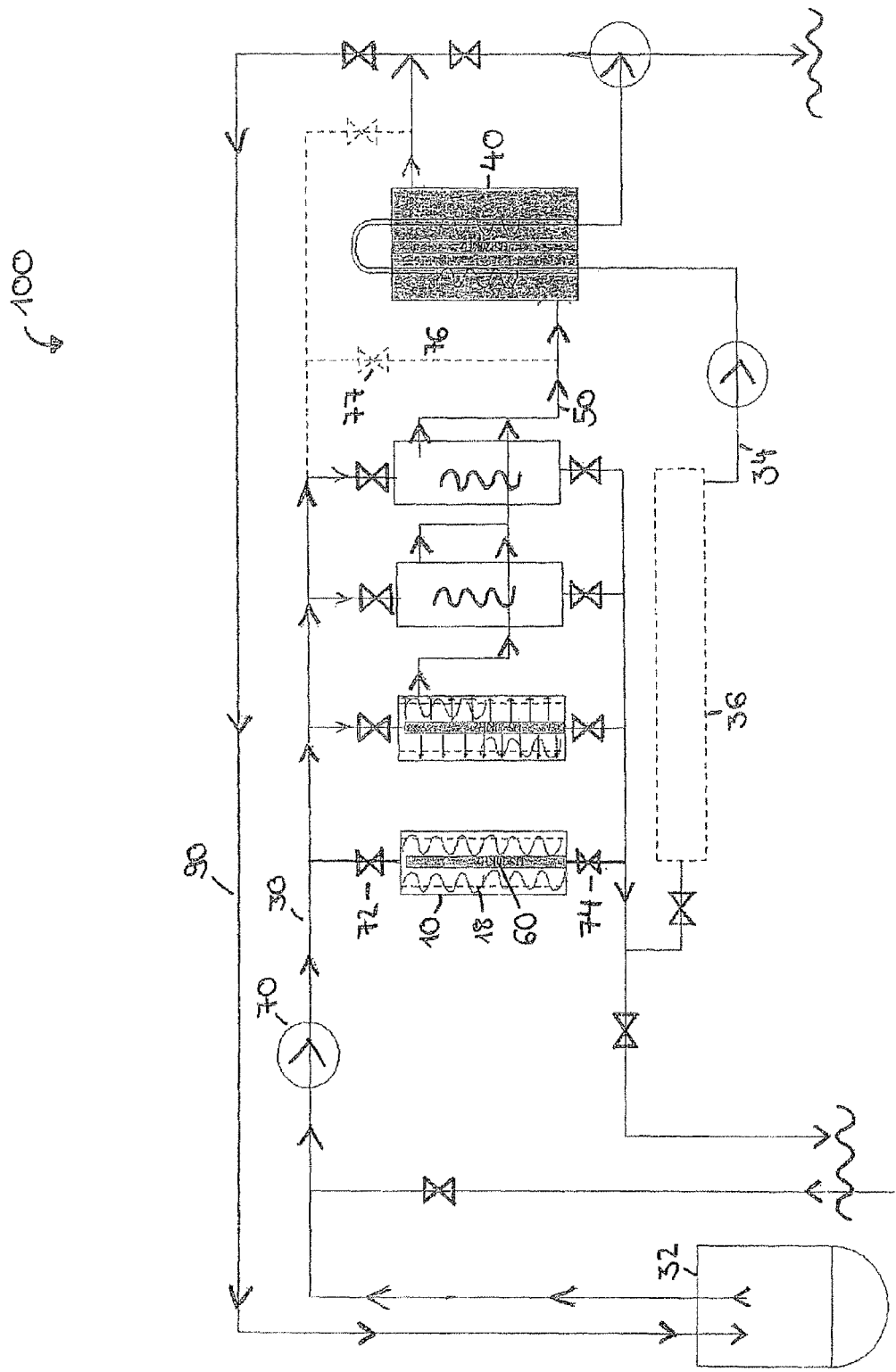

In FIG. 4, an embodiment of the apparatus 100 during the circulation of the water as present in the ballast water tank 32 is shown.

Of the four filter modules 10 as shown, the three on the right side are connected to the supply 30 (i.e., the respective inlet valve 72 is open), and are in filtrating operation. The left filter module 10 is disconnected (inlet valve 72 is closed), and is in a purification mode, wherein the filter module filled with water is operated with ultrasound from the source of ultrasound 60 for a purification of the filter membrane 18.

The water from the ballast water tank 32 is directed by the pump for ballast water 70 to the three filter modules 10 on the right side, where the water is filtered. Subsequently, the water that is filtered accordingly flows into the reactor 40, where it is exposed to a treatment with ultrasound and UV-light. The purified water flows back into the ballast water tank 32 through the recycling line 90.

Alternatively, in the embodiment as shown in FIG. 4, the filter modules 10 can be bypassed through the bypass valve 77, and only the disinfection by the reactor 40 can be used.

Figure 5:
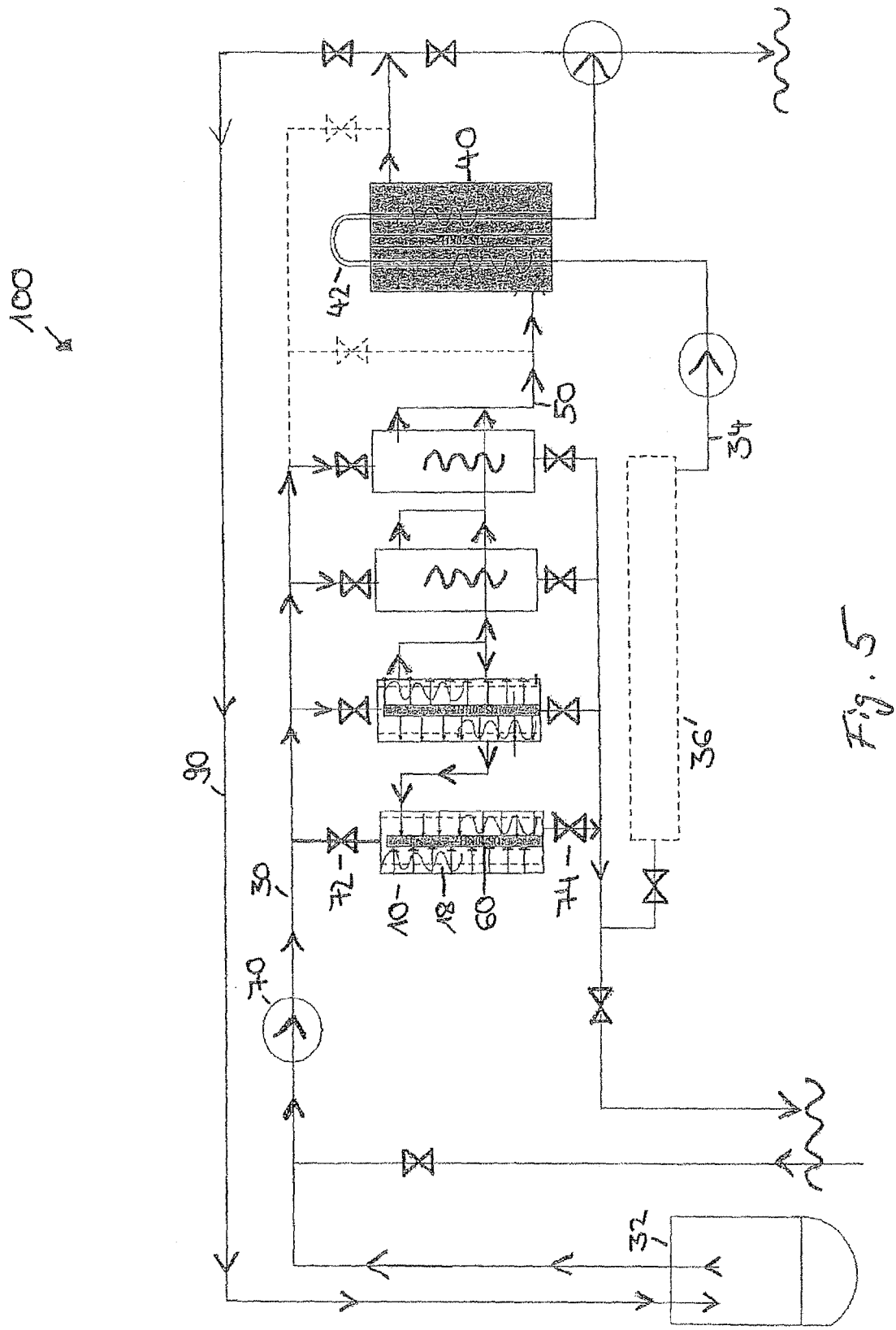

FIG. 5 shows an embodiment of the apparatus 100 during purification of the waters from the ballast water tank 32 in analogy to the purification according to FIG. 4.

As in the embodiment according to FIG. 4, the filter modules 10 on the right side are in the filtration mode, and the left filter module 10 is in the purification mode. In FIG. 5, furthermore the back-flushing of the first filter module 10 is shown. In contrast to FIG. 4, the valve 74 of the first outlet 14 of the first filter module 10 (i.e., the left filter module) is at least partially opened, so that filtered liquid flows through the second outlet 16 of the first filter module 10 through the back-flushing line 20, which connects the second outlets 16 of the four filter modules as shown, backwards through the filter membrane 18 of the first filter module 10, and is passed through the first outlet 14 of the first filter module 10 back into the sea. If the degree of purity of the back-flushed liquid is insufficient to be immediately discharged back into the sea, alternatively the back-flushed liquid can also be directed through the line 34 to the reactor 40, and through the line for liquids 42 through the interior 41 thereof, in order to provide for additional purification of the back-flushed water (shown in FIG. 7). Hereby, the second container 36 can be used as a buffer for the back-flushed volume of water, so that the back-flushed liquid can be directed through the interior 41 of the reactor 40, for example, with a lower throughput-rate, and thus with a longer time of contact.

Figure 6:
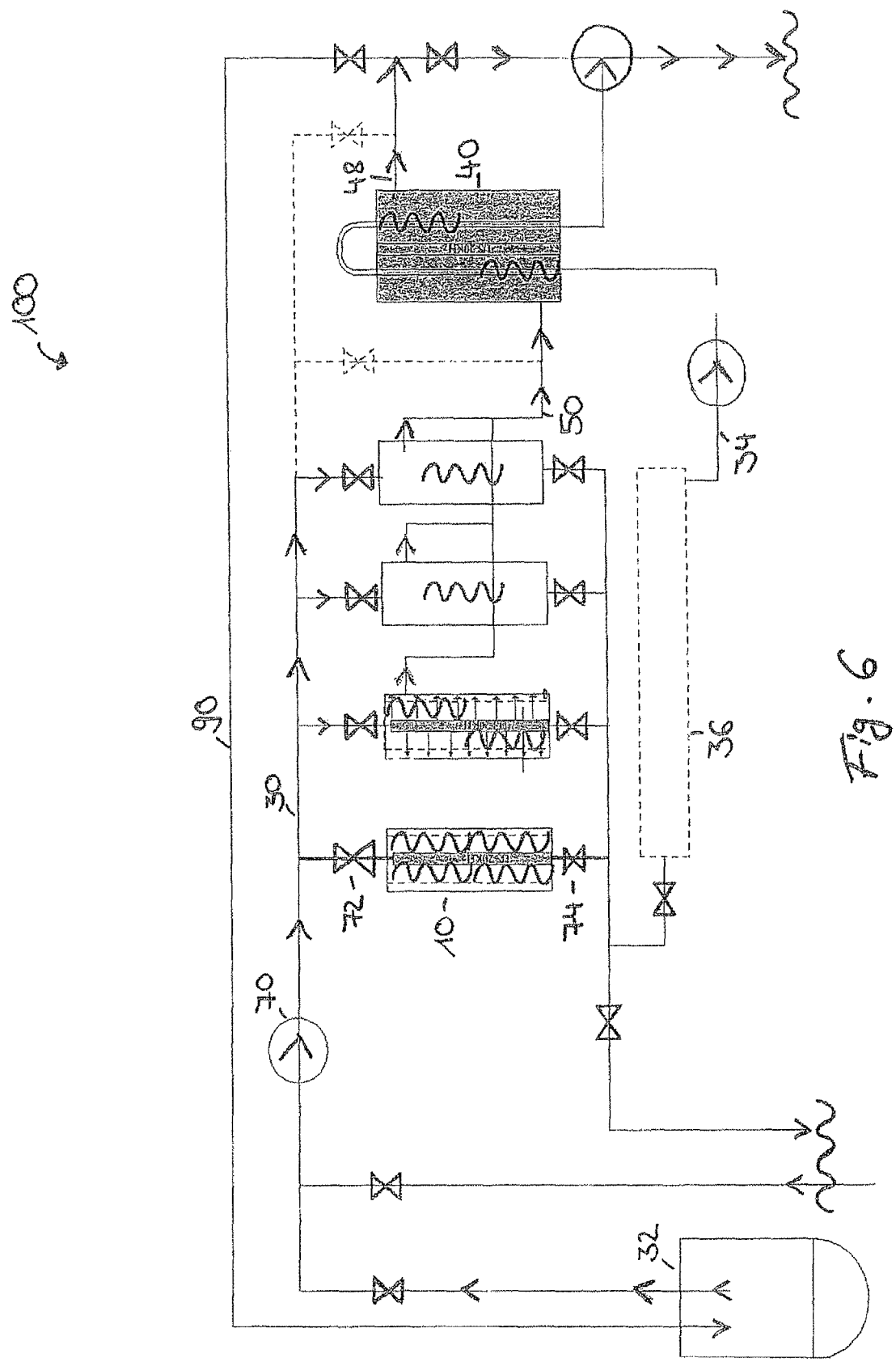

FIG. 6 shows the embodiment of the apparatus 100 during purification and subsequent discharging of the ballast water from the tank 32 back into the sea.

For this, the water from the tank 32 is pumped by the pump 70 into the three filter modules 10 on the right side. If the valves 74 of the respective first outlets 14 of the three modules on the right side are closed, the ballast water passes through the respective filter membrane 18, and reaches filtered through the second line 50 into the inside of the reactor 41. Following the treatment with UV-light and ultrasound in the inside of the reactor 41, the ballast water flows out of the reactor 40 through the second outlets 16 and the outlet 48, and can be discharged into the sea as purified water.

Figure 7:
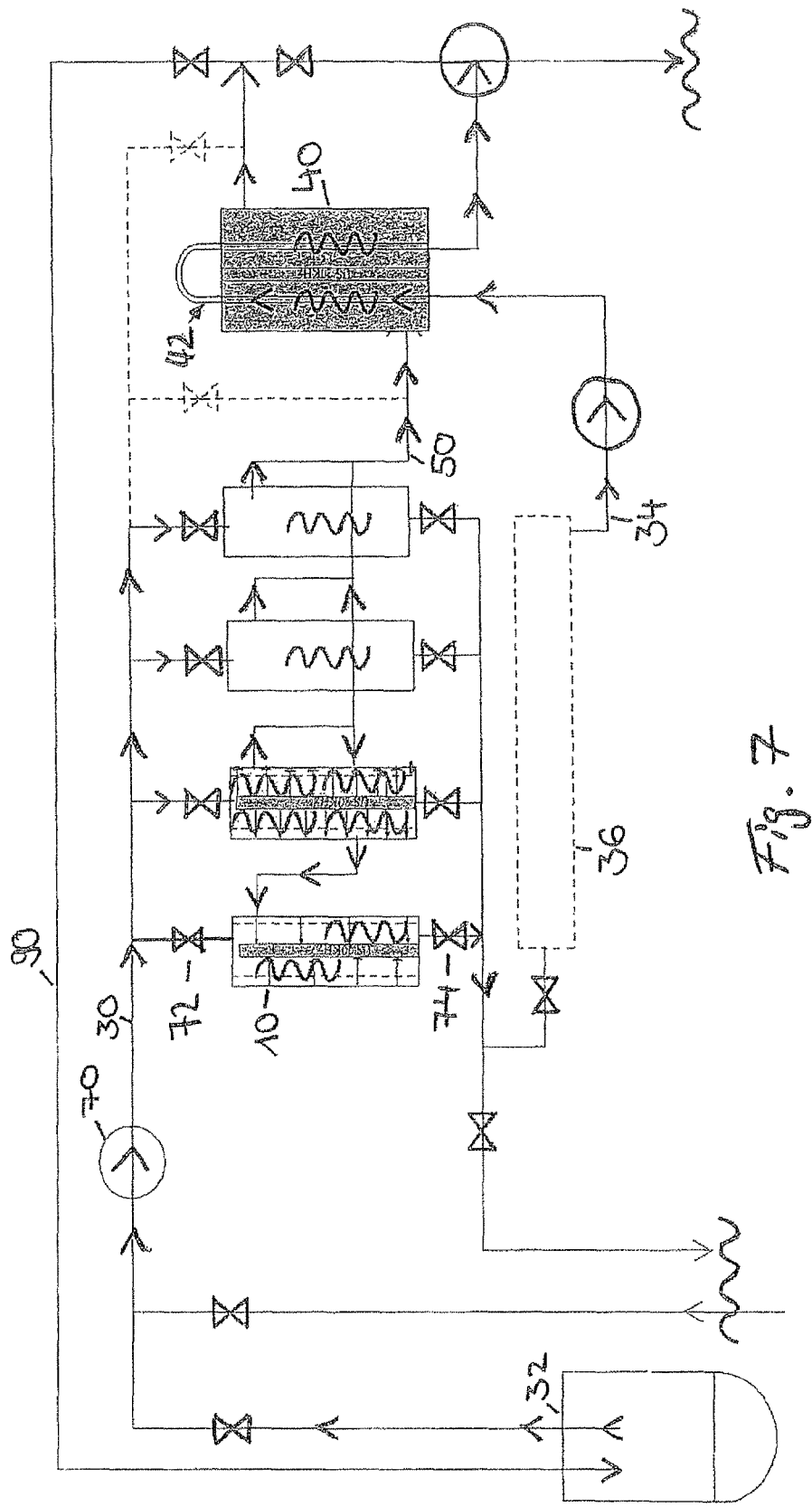

FIG. 7 shows the embodiment of the apparatus 100 during discharging of the ballast water as stored, and the simultaneous back-flushing of a filter module 10.

The three of the four filter modules 10 from the right as depicted are in the filtration mode, whereas the left filter module 10 is disconnected from the supply 30, and is in the back-flushing mode. Through the first line 34 and the second container 36 as positioned therein back-flushed water as first volume flow reaches through the first module to the reactor 40, and is directed for two times through the interior 41 thereof through the line for liquids 42 that are made of two quartz pipes 84, as described above, and purified. Through the second line 50 filtered water from the three modules on the right reaches the reactor 40, and immediately flows into and through the interior 41 thereof, whereby this second volume flow is also purified.

The first volume flow of back-flushed water from the first filter module 10 and the second volume flow of filtered water from the other three filter modules 10 are thus disinfected separately from each other and with different flow rates in the reactor 40, and subsequently can be discharged into the sea without any problem.

Figure 8:
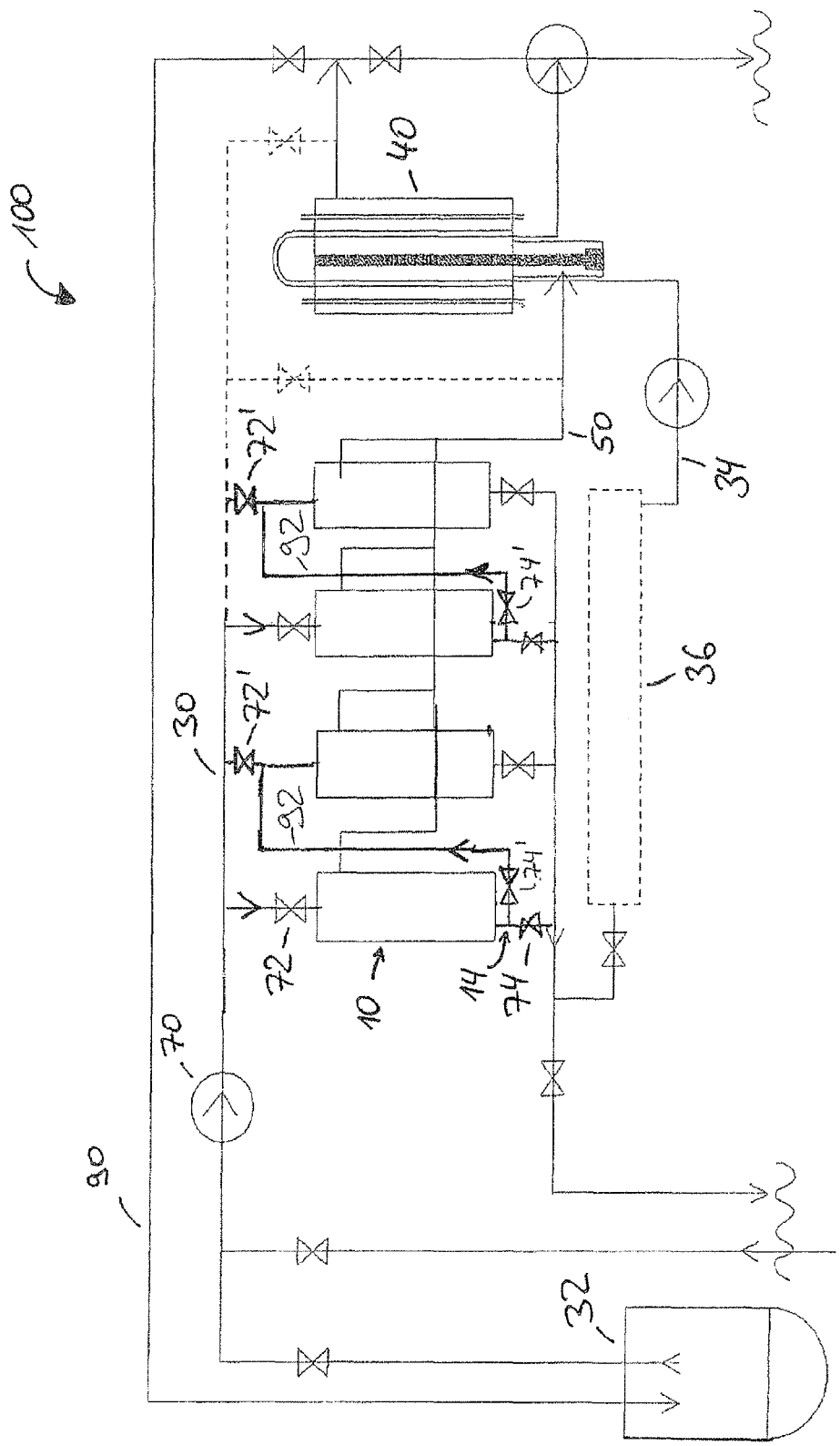
FIG. 8 shows an embodiment with filter modules aligned pair-wise in series.

FIG. 8 shows an additional embodiment of the apparatus 100. The first (from the left) filter module has a branching 92 from the first outlet 14. This branching 92 is connected to the inlet 12 of the second (from the left) filter module, so that unfiltered liquid from the first filter module can be treated and filtered in the second filter module. The third and fourth filter module are arranged in series in the same manner.

Using the valves 74, 74' as shown in FIG. 8, the liquid passing through the first outlet 14 can be directed to the first line 34 and/or through the branching 92.

Furthermore, through an optional line with valve 72', the inlet of the second filter module can also be connected to the liquid supply. Upon a closed valve 74', the apparatus 100 as shown in FIG. 8 can thus also be operated as described above with reference to the FIGS. 1 to 7.

The features as disclosed in the above description, claims and the figures can both individually as well as in any combination be important for carrying out the invention in its different embodiments.

LIST OF REFERENCE NUMERALS

Apparatus for purifying of liquids 100
Filter module 10
Inlet 12
First outlet 14
Second outlet 16
Filter, membrane 18
Back-flushing line 20
Liquid supply 30
First container 32
First line 34
Second container 36
Reactor 40
Inside of the reactor 41
Line for liquids 42
UV-light source 44
Reactor inlet 46
Reactor outlet 48
Second line 50
Source of ultrasound 60
Ballast water pump 70
Inlet valve 72, 72'
Valve of the first outlet 74, 74'
First bypass-line 76
First bypass valve 77
Second bypass-line 78
Cavitation chamber 80
Source of ultrasound (reactor) 82
Quartz pipe 84
Pipe connection 86
Recycling line 90
Branching 92

The invention claimed is:

1. An apparatus for purifying liquids, comprising
at least two filter modules (10); and
a reactor (40) with at least one UV-light source (44),
wherein each filter module (10) comprises an inlet (12) for the liquid to be purified, a first outlet (14), a filter (18), and a second outlet (16) for the filtered liquid, wherein for liquid incoming through the inlet (12) the first outlet (14) is positioned before the filter (18), and the second outlet (16) behind the filter (18),
wherein the reactor (40) is connected with the first outlets (14) through a first line (34) and with the second outlets (16) through a second line (50), and
wherein the reactor (40) is adapted to expose a first volume flow that reaches the reactor (40) through the first line (34), and a second volume flow that reaches the reactor (40) through the second line (50), to UV-light from the UV-light source (44).

2. The apparatus according to claim 1, which is adapted to separately direct the first volume flow and the second volume flow through the reactor.

3. The apparatus, according to claim 1, wherein the second outlets (16) are connected through a back-flushing line (20) in such a way that a back-flushing of the filter (18) of a filter module (10) can be carried out with filtered liquid from the other filter module (10).

4. The apparatus, according to claim 3, which is adapted to direct the liquid as back-flushed through the filter (18) of one filter module (10) through the first line (34) as a first volume flow to the reactor (40).

5. The apparatus, according to claim 1, wherein the inlet (12) of each filter module (10) comprises an inlet valve (72).

6. The apparatus, according to claim 5, wherein the first outlet (14) of each filter module (10) comprises an outlet valve (74).

7. The apparatus according to claim 6, wherein the second outlets (16) are connected with each other through a back-flushing line (20) in such a way that upon a closed inlet valve (72) of the inlet (12) of one filter module (10), and an opened outlet valve (74) of the first outlet (14) of one filter module (10), a back-flushing of the filter (18) of one filter module (10) with filtered liquid of the other filter module (10) can be carried out.

8. The apparatus, according to claim 1, which further comprises a first container (32) for storing the liquid to be purified, which is connected to the inlets (12) of the filter module (10).

9. The apparatus, according to claim 1, which further comprises a second container (36) positioned in the first line (34) and adapted to catch liquid.

10. The apparatus, according to claim 1, wherein the reactor (40) further comprises a source of ultrasound (82) for exposing the first and the second volume flow to ultrasound.

11. The apparatus, according to claim 1, wherein the reactor (40) comprises an inlet (46) leading into the inside of the reactor (41), and an outlet (48) leading out of the inside of the reactor (41).

12. The apparatus according to claim 11, wherein the second line (50) is connected to the inlet (46) of the reactor in such a way that the second volume flow can flow through the inlet (46) into the inside of the reactor (41), and can flow out of the inside of the reactor through the outlet (48) of the reactor.

13. The apparatus, according to claim 1, wherein the UV-light source (44) and a source of ultrasound (82) are positioned inside the reactor (41).

14. The apparatus according to claim 1, wherein the reactor (40) comprises a line for liquids (42), which leads through the inside of the reactor (41), and is in the inside of the reactor (41) and self-contained relative to the inside of the reactor.

15. The apparatus according to claim 14, wherein the line for liquids (42) is connected to the first line (34) in such a way that the first volume flow flows through the inside of the reactor (41) through the line for liquids (42).

16. The apparatus according to claim 14, wherein the line for liquids (42) is formed out of UV-permeable material.

17. The apparatus according to claim 14, wherein the line for liquids (42) comprises one or several quartz pipes (84) that cross the inside of the reactor (41) and are arranged in parallel or in series.

18. The apparatus according to claim 1, wherein the inside of the reactor (41) is crossed by at least one quartz pipe, and wherein the UV-light source (44), or one UV-light source (44) each, respectively, is positioned in the quartz pipe.

19. The apparatus according to claim 1, wherein the filter (18) of each filter module (10) comprises a membrane.

20. The apparatus according to claim 1, wherein each filter module (10) comprises a source of ultrasound (60) for irradiating the filters (18) with ultrasound.

21. The apparatus according to claim 1, wherein the filter (18) has pores of less than 1000 µm.

22. The apparatus according to claim 1, wherein the filter (18) comprises pores of down to 0.1 µm.

23. The apparatus according to claim 1, wherein two filter modules (10) are connected in series by connecting the first outlet (14) of the first filter module to the inlet (12) of the second filter module.

24. A method for the treatment of ballast water wherein said method comprises delivering ballast water to the apparatus according to claim 1 and passing the water through said apparatus thereby purifying the water.

25. The method, according to claim 24, wherein each one of the filter modules (10) is back-flushed in succession.

* * * * *